United States Patent [19]

Kiyohara et al.

[11] Patent Number: 5,479,620
[45] Date of Patent: Dec. 26, 1995

[54] CONTROL UNIT MODIFYING MICRO INSTRUCTIONS FOR ONE CYCLE EXECUTION

[75] Inventors: Tokuzo Kiyohara; Kozo Kimura; Takahiro Watanabe, all of Osaka, Japan

[73] Assignee: Matsushita Electric Industrial Co., Ltd., Osaka, Japan

[21] Appl. No.: 103,178

[22] Filed: Aug. 9, 1993

Related U.S. Application Data

[63] Continuation of Ser. No. 515,518, Apr. 30, 1990, abandoned.

[30] Foreign Application Priority Data

May 8, 1989  [JP]  Japan ................................ 1-114740

[51] Int. Cl.⁶ .................................................... G06F 9/22
[52] U.S. Cl. ................................ 395/375; 364/DIG. 1
[58] Field of Search .......................................... 395/375

[56] References Cited

U.S. PATENT DOCUMENTS

| | | |
|---|---|---|
| 4,109,311 | 8/1978 | Blum et al. ............................. 395/375 |
| 4,419,726 | 12/1983 | Weldner . |
| 4,467,417 | 8/1984 | Woods et al. ........................... 395/375 |
| 4,825,363 | 4/1989 | Baumann et al. ....................... 364/375 |
| 4,967,338 | 10/1990 | Kiyohara et al. ...................... 364/200 |
| 4,984,151 | 1/1991 | Dujari .................................... 364/200 |
| 5,155,819 | 10/1992 | Watkins et al. ......................... 395/375 |

FOREIGN PATENT DOCUMENTS

| | | |
|---|---|---|
| 184158 | 6/1986 | European Pat. Off. . |
| 57-105036 | 6/1982 | Japan . |
| 59-57346 | 4/1984 | Japan . |
| 62-143138 | 6/1986 | Japan . |

*Primary Examiner*—William M. Treat
*Attorney, Agent, or Firm*—Lowe, Price, LeBlanc & Becker

[57] ABSTRACT

A control device includes a memory storing a plurality of micro instructions. A modifying information generator generates modifying information. A modifying unit receives one of the micro instructions and the modifying information from the memory and the modifying information generator respectively. The modifying unit modifies at least part of the one of the micro instructions with the modifying information.

8 Claims, 6 Drawing Sheets

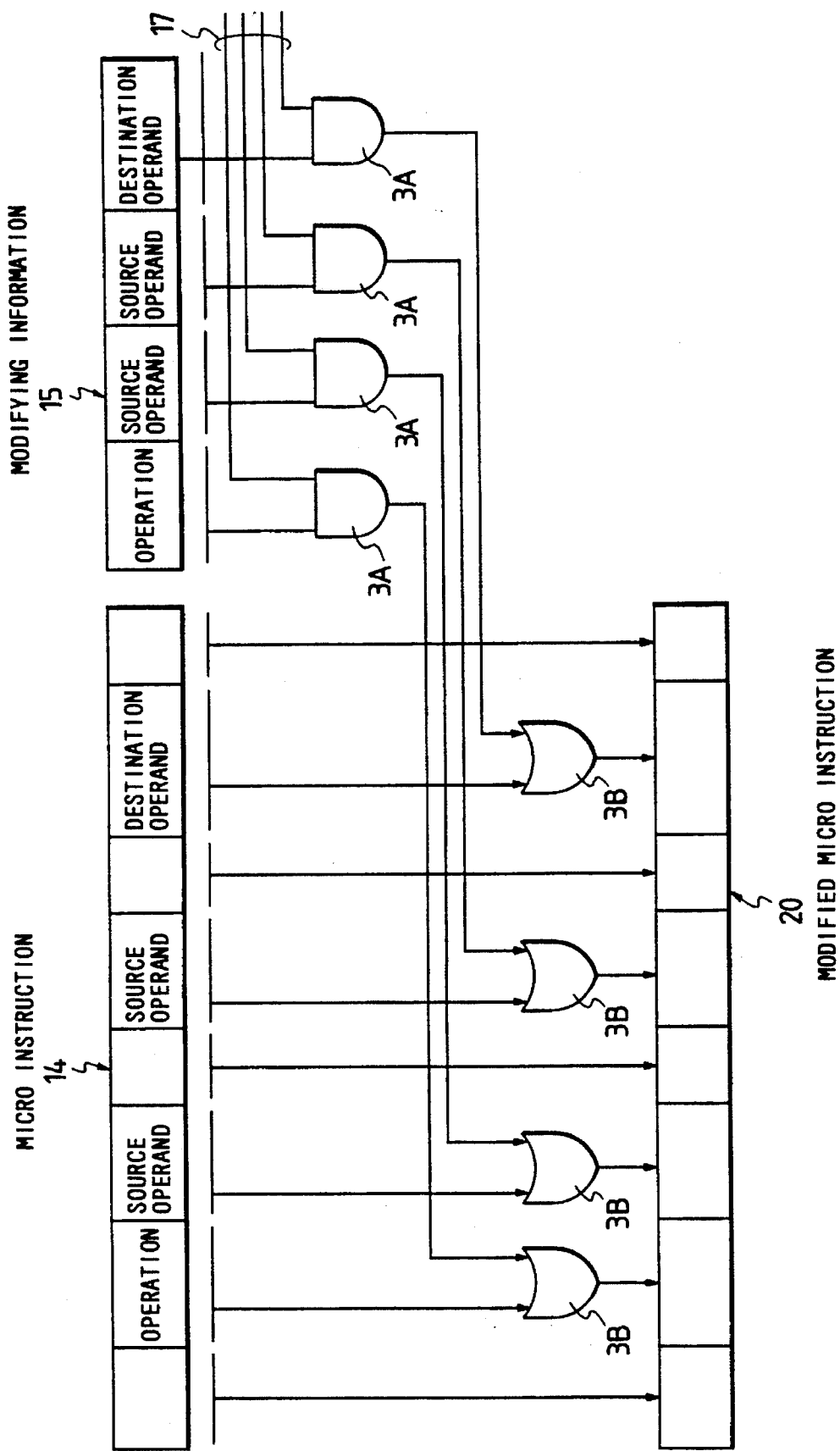

DATA TRANSFER BETWEEN REGISTERS (reg0→reg1)

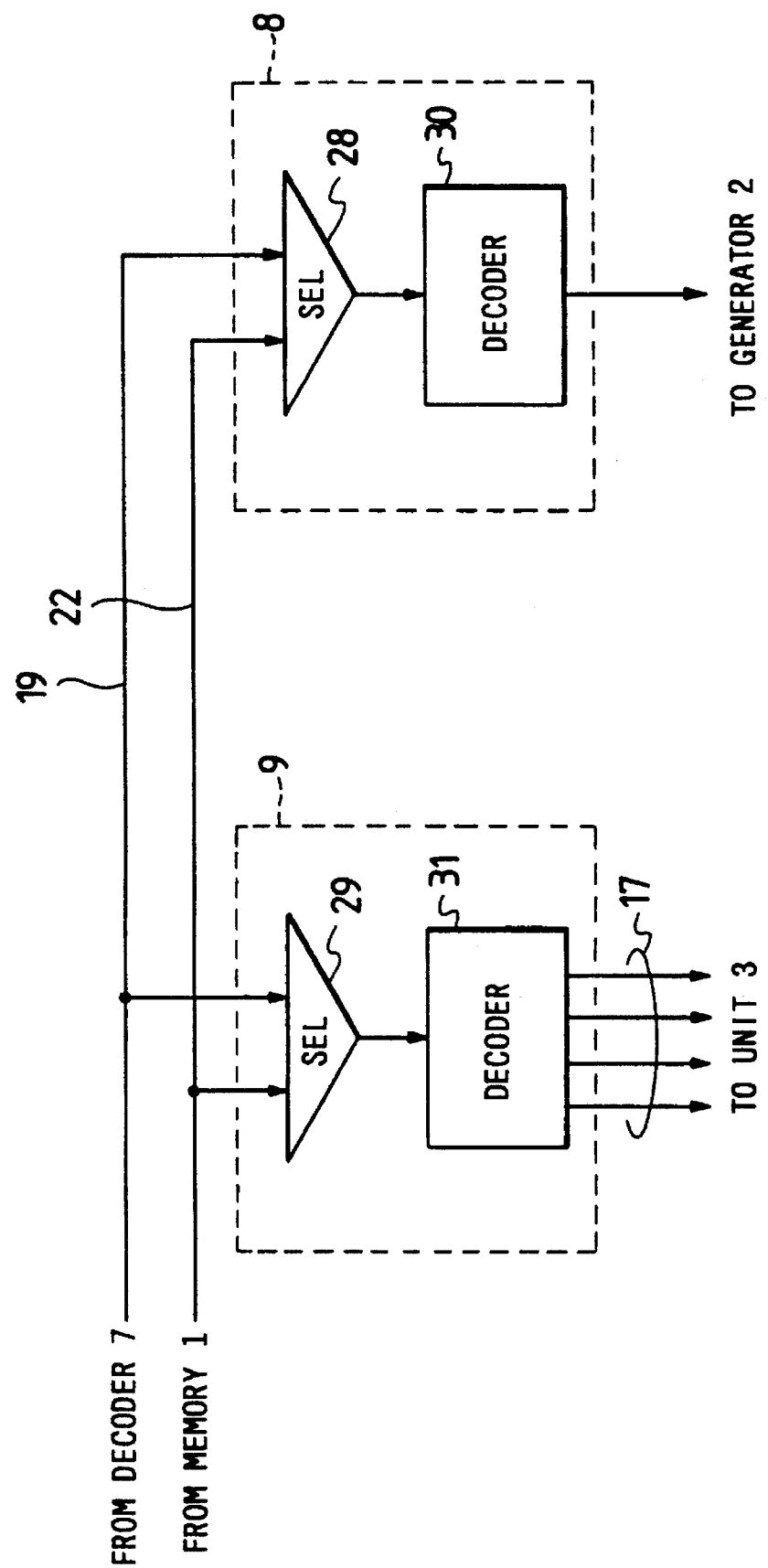

CONTROL UNIT MODIFYING MICRO INSTRUCTIONS FOR ONE CYCLE EXECUTION

This application is a continuation of application Ser. No. 07/515,518 filed Apr. 30, 1990, now abandoned.

BACKGROUND OF THE INVENTION

This invention relates to a device in a computer which controls an arithmetic unit in a method using a microprogram.

Japanese published unexamined patent application 62-143138 discloses a device in a computer which controls an arithmetic unit in a method using a microprogram. The control device of the application 62-143138 has a function of modifying a micro instruction. In the application 62-143138, the modifying function is limited only to a disabling function.

SUMMARY OF THE INVENTION

It is an object of this invention to provide an excellent control device having a function of modifying a micro instruction.

According to a first aspect of this invention, a control device includes a memory storing a plurality of micro instructions, and a modifying information generator generating modifying information. A modifying unit receives one of the micro instructions from the memory and receives the modifying information from the modifying information generator. The modifying unit modifies at least part of the one micro instruction with the modifying information.

According to a second aspect of this invention, a control device includes a memory storing a plurality of micro instructions and a selector for selecting one of several pieces of input information. An input register connected to the selector stores the selected input information. A modifying information generator connected to the input register generate modifying information based on the input information. A modifying unit receives one of the micro instructions from the memory and the modifying information from the modifying information generator. The modifying unit modifies at least part the micro instruction with the modifying information.

BRIEF DESCRIPTION OF THE DRAWINGS

FIG. 2(a) is a block diagram of a portion of the modifying unit of FIG. 1.

FIG. 5 is a block diagram of the controllers of FIG. 1.

DESCRIPTION OF THE PREFERRED EMBODIMENT

Figure 1:
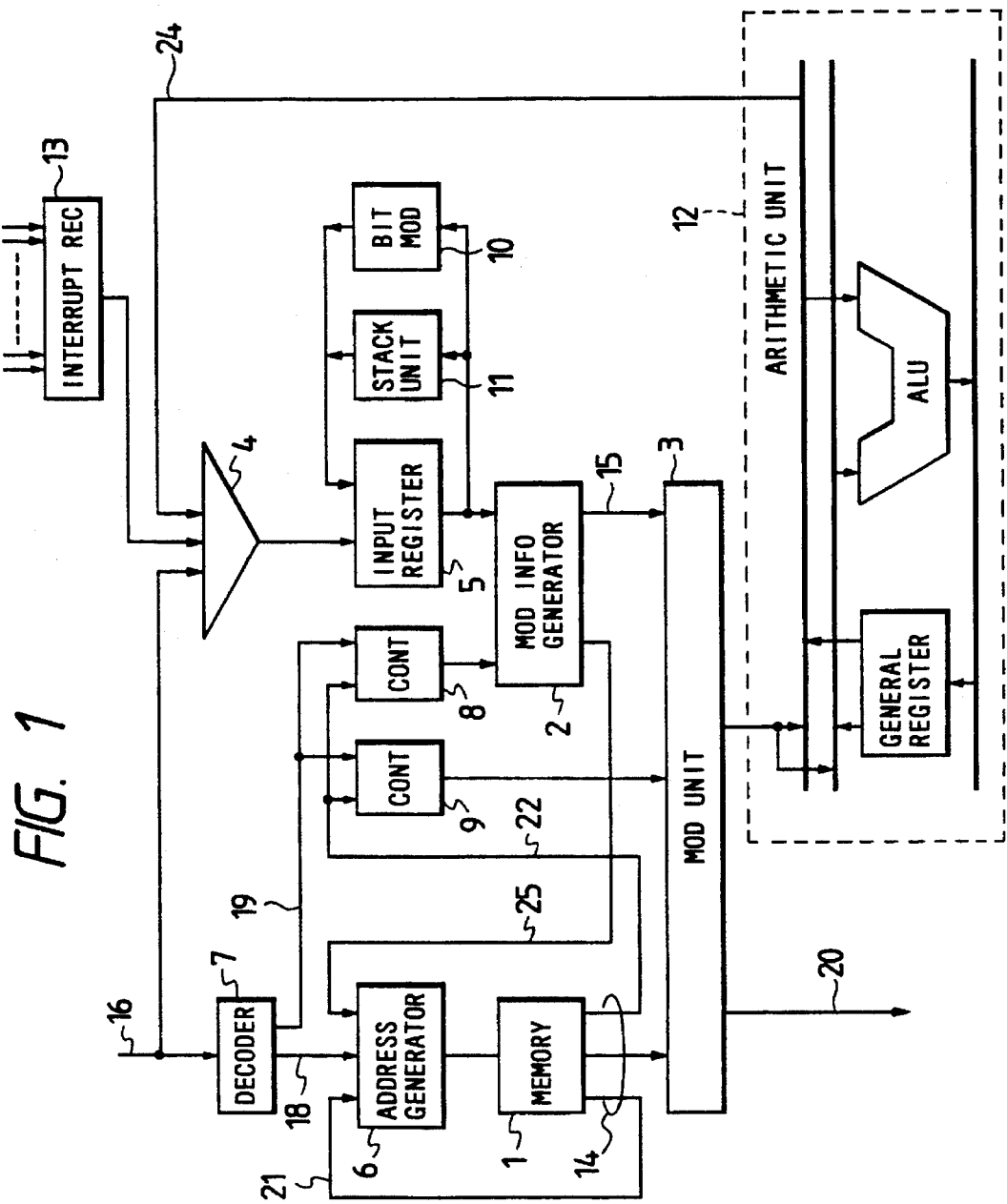
FIG. 1 is a block diagram of a control device according to an embodiment of this invention.

With reference to FIG. 1, a control device includes a memory 1 which stores a plurality of micro instructions. A modifying information generator 2 composed of a PLA (a programmable logic array) generates information for modifying a micro instruction. A modifying unit 3 receives a micro instruction 14 from the memory and receives modifying information 15 from the modifying information generator 2. Unit 3 executes a process of modifying the micro instruction 14 by the modifying information 15.

Data to be inputted into the modifying information generator 2 are selected from a plurality of pieces of data by a selector 4, and the selected data are stored into an input register 5. An address generator 6 outputs an address signal (simply referred to as an address hereinafter) to the memory 1. A decoder 7 decodes a macro instruction 16. The modifying information generator 2 is controlled by a controller 8. The modifying unit 3 is controlled by a controller 9. A bit modifying unit 10 modifies data in a predetermined bit of the input register 5. A stack unit 11 functions to save the data stored in the input register 5 and to return the saved data to the input register 5. An arithmetic unit or an execution unit 12 receives a modified micro instruction from the modifying unit 3 and executes the instruction. The arithmetic unit 12 includes an ALU main part and a general register. An interruption reception unit 13 stores information of interruption factors.

FIG. 2(a) shows a portion of the modifying unit 3 which functions to modify predetermined information within a micro instruction, wherein the predetermined information will be outputted as control information. Specifically, this portion of the modifying unit 3 functions to modify an operation field, two source operand fields, and a destination operand field of a micro instruction 14 using modifying information 15 including an operation field, two source operand fields, and a destination operand field in accordance with control information 17 outputted from the controller 9. The operation field designates an operation to be executed by the arithmetic unit 12. The modifications of the four fields are mutually independent. The control information 17 has four bits corresponding to the respective four fields. In addition, the modifying unit 3 has four AND gates 3A and four OR gates 3B corresponding to the respective four fields. When a bit of the control information 17 is "1", the corresponding AND gate is open so that modifying information 15 of the corresponding field is transmitted to the corresponding OR gate and an "OR" operation between the modifying information 15 and the micro instruction 14 of the field is executed. When a bit of the control information 17 is "0", the corresponding AND gate is closed so that the transmission of the corresponding field of the modifying information 15 to the corresponding OR gate is inhibited and the modification of the field of the micro instruction 14 is also inhibited.

Figure 2B:
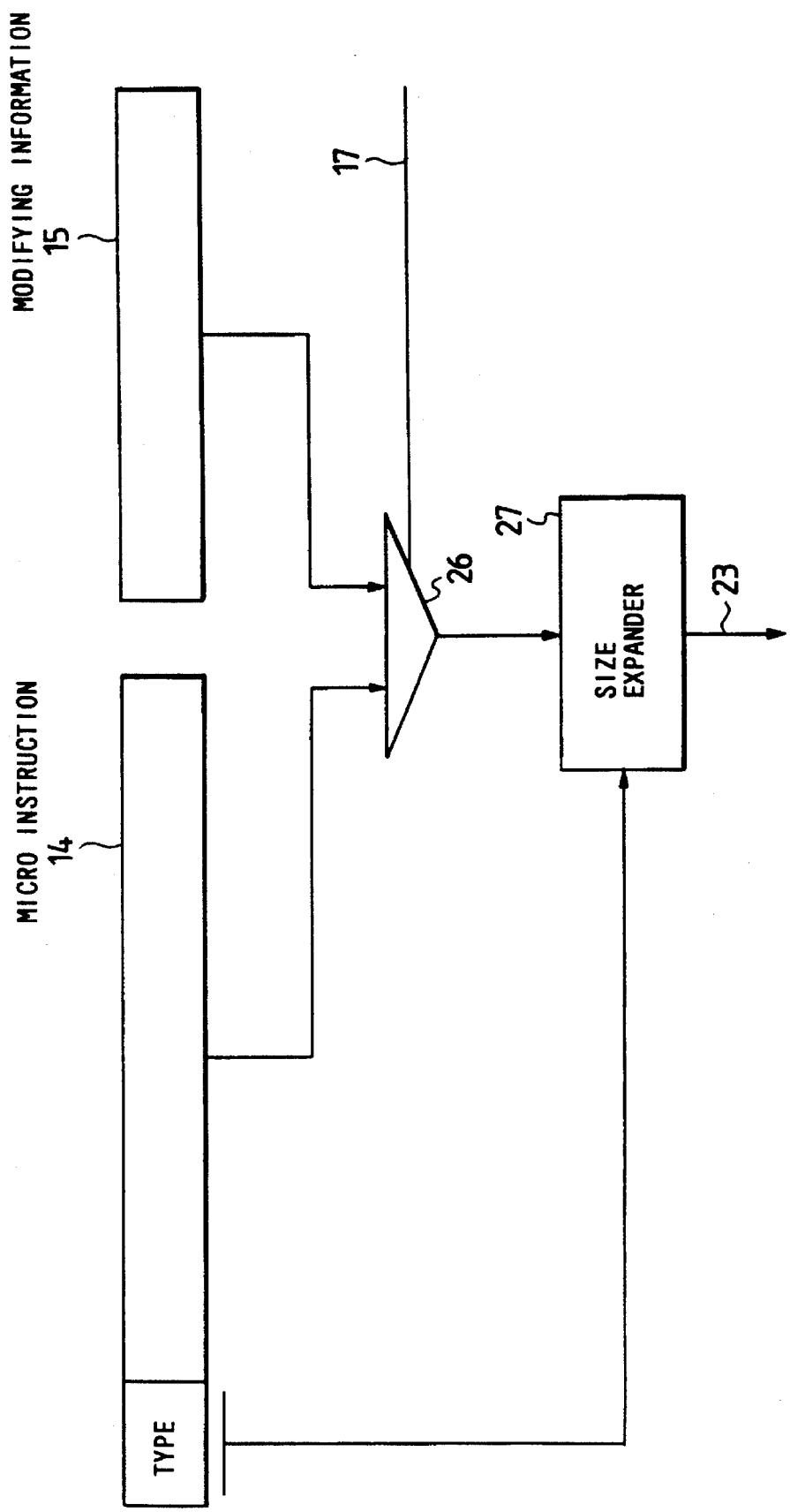
FIG. 2(b) is a block diagram of another portion of the modifying unit of FIG. 1.

FIG. 2(b) shows another portion of the modifying unit 3 which functions to modify predetermined information within a micro instruction, wherein this predetermined information will be outputted to the arithmetic unit 12 as data. Specifically, this portion of the modifying unit 3 includes a selector 26 operative to select fields of a micro information 14 and modifying information 15 which are used as data. This selection is controlled by control information 17 outputted from the controller 9. Generally, a micro instruction is of a plurality of types. A type field of a micro instruction denotes a type of the micro instruction. Fields of a micro instruction which are used as data are dependent on tile type of the micro instruction. In view of this fact, data selected by the selector 26 are expanded in size by an expander 27 in accordance with the type field of a micro instruction 14, and the resultant data 23 are outputted to the arithmetic unit 12.

Figure 4A:
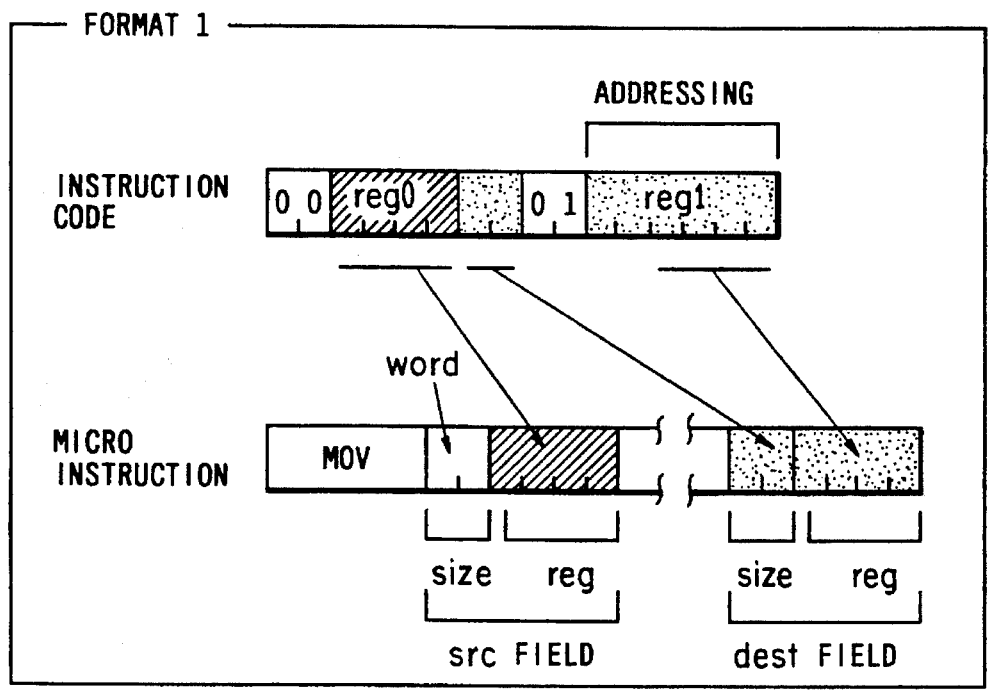
FIG. 4 is a diagram showing two different formats of a macro instruction for the data transfer between registers.
Figure 4B:
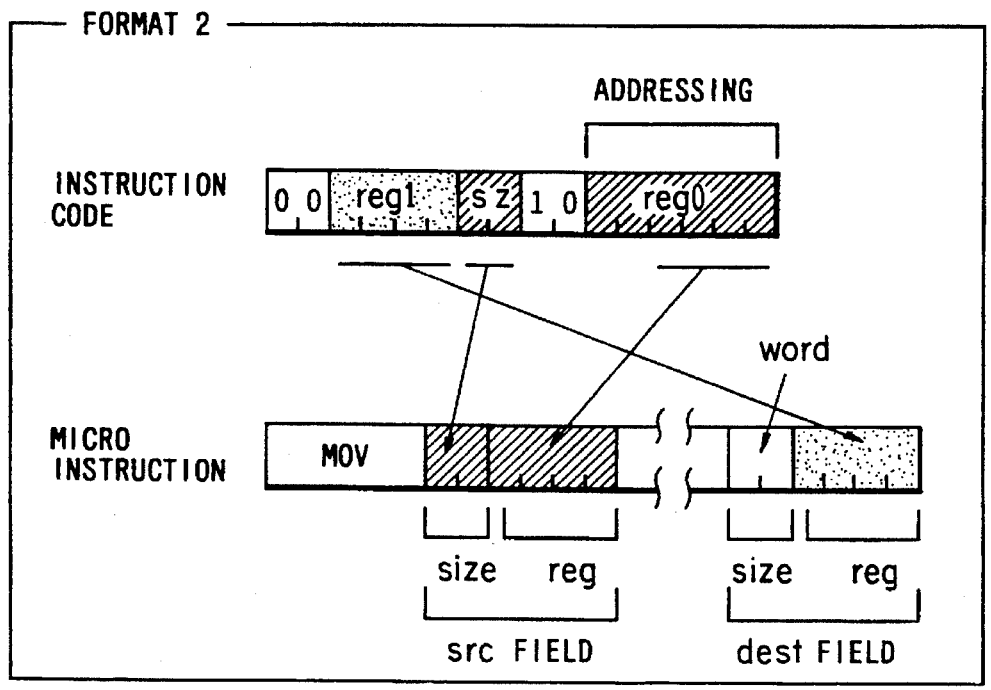

As shown in FIG. 4, a macro instruction for the data transfer between two registers (reg0 and reg1) has two different formats denoted by FORMAT 1 and FORMAT 2 respectively. The information inputted into the modifying information generator 2 is represented by "input=[cont, data]" where "cont" denotes the output signal from the controller 8 and "data" denotes the output signal from the input register 5. The PLA of the modifying information generator 2 is programmed to execute the following operation.

In the case of FORMAT 1:
if cont=reg_of_format1
  then
  modifying information (source operand)=[b'00', data[2:5]];
  modifying information (destination operand)=[data[6:7], data[12:15]];
In the case of FORMAT 2:
if cont=reg_of_format2
  then
  modifying information (source operand)=[data[6:7], data[12:15]];
  modifying information (destination operand)=[b'00', data[2:5]];

The overall modifying operation will be explained hereinafter.

In the case of FORMAT 1:
Before Modification
micro instruction (operation)="mov"
micro instruction (source operand)=[b'10', b'0000'];
where "b'10'" corresponds to size=word;
micro instruction (destination operand)=[b'00', b'0000'];
control information 17 (operation)=0
control information 17 (source operand)=1
control information 17 (source operand)=0
control information 17 (destination operand)=1
After Modification
micro instruction (operation)="mov"
micro instruction (source operand)=[b'10', data[2:5]];
micro instruction (destination operand)=[data[6:7], data[12:15]];
In the case of FORMAT 2:
Before Modification
micro instruction (operation)="mov"
micro instruction (source operand)=[b'00', b'0000'];
micro instruction (destination operand)=[b'10', b'0000'];
where "b'10'" corresponds to size=word;
control information 17 (operation)=0
control information 17 (source operand)=1
control information 17 (source operand)=0
control information 17 (destination operand)=1
After Modification
micro instruction (operation)="mov"
micro instruction (source operand)=[data[6:7], data[12:15]];
micro instruction (destination operand)=[b'10', data[2:5]];

As shown in FIG. 5, the controller 8 includes a selector 28 and a decoder 30. The selector 28 selects either the control information 19 from the decoder 7 or the control information 22 from the memory 1. This selection will be described in more detail later. The decoder 30 generates a control signal in accordance with the control information selected by the selector 28. The control signal is outputted from the decoder 30 to the modifying information generator 2. The modifying information generator 2 is controlled by the control signal as described later.

Similarly, the controller 9 includes a selector 29 and a decoder 31. The selector 29 selects either the control information 19 from the decoder 7 or the control information 22 from the memory 1. This selection will be described in more detail later. The decoder 31 generates a control signal 17 in accordance with the control information selected by the selector 29. The control signal 17 is outputted from the decoder 31 to the modifying unit 3. The modifying unit 3 is controlled by the control signal 17 as described later.

Figure 3:
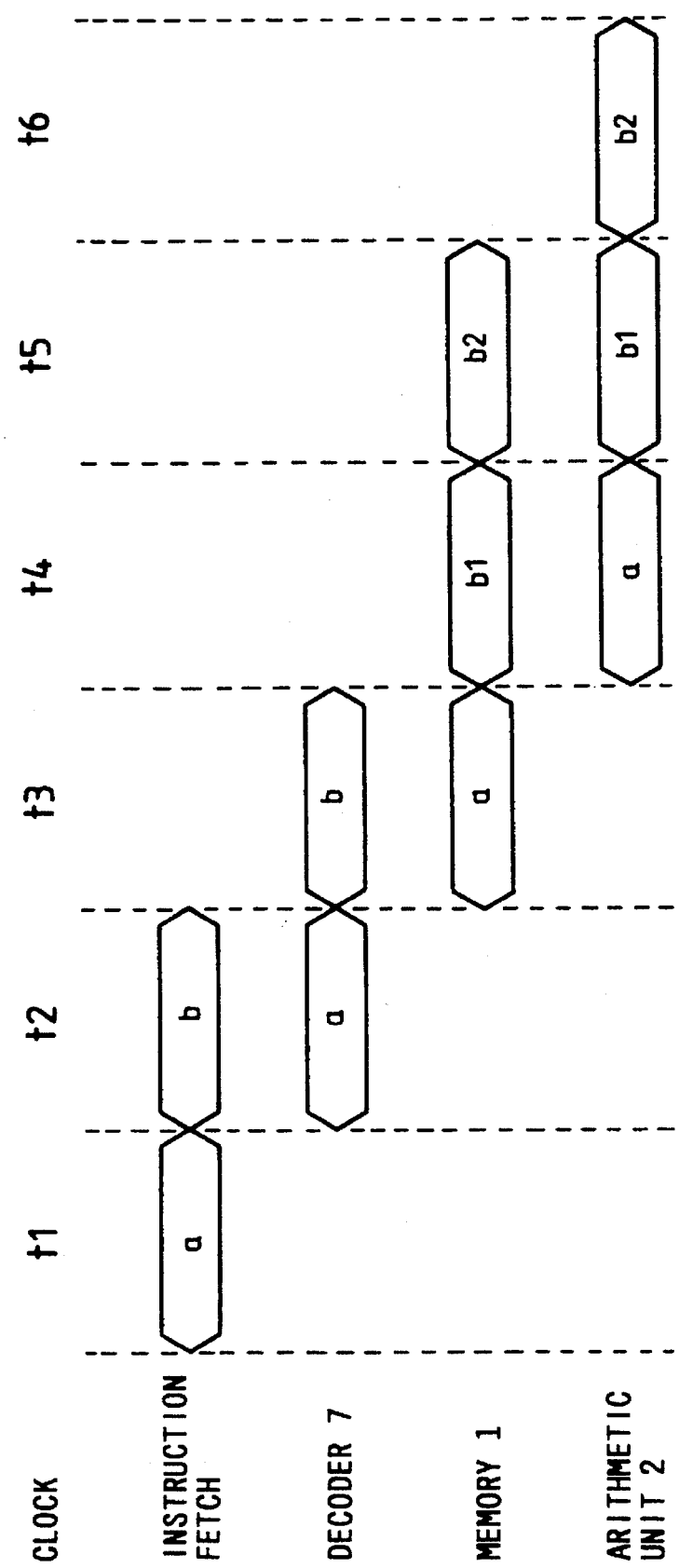
FIG. 3 is a timing diagram showing an example of basic operation of the control device of FIG. 1 which occurs during an instruction decoding process.

FIG. 3 shows an example of basic operation of the control device of FIG. 1 which occurs during an instruction decoding process. In this example, instructions "a" and "b" are handled. The instruction "a" is an instruction of operation between registers which can be executed in one clock period. The instruction "b" is an instruction of operation between a memory and a register which can be executed in two clock periods.

The processing of the instruction "a" will be explained hereinafter. A macro instruction for the instruction "a" is fetched at a clock period t1.

During a clock period t2 immediately following the clock period t1, the macro instruction is decoded by the decoder 7 so that an entry address 18 and control information 19 are generated by the decoder 7 on the basis of the macro instruction. The entry address 18 is fed to the address generator 6. The control information 19 is fed to the controllers 8 and 9.

During a clock period t3 subsequent to the clock period t2, the address generator 8 outputs an address denoted by the entry address 18, and the memory 1 outputs a micro instruction 14 in response to the address fed from the address generator 6. In this case, while the operation field of the micro instruction 14 has information representing an operation to be executed by the arithmetic unit 12, the two source operand fields and the destination operand field are set to "00 ... 0". The selector 4 selects a macro instruction 16, and sets the macro instruction for the instruction "a" in the input register 5. The controller 8 controls the modifying information generator 2 in accordance with the control information 19, cutting out a register number field from the macro instruction for the instruction "a" and outputting the register number field from the modifying instruction generator 2 as modifying instruction 15. The register number field is necessary in a micro instruction. Specifically, a register number at a source side of the macro instruction is cut out, and the register number is set in a modification field of one of source operands of the modifying information 15. In addition, a register number at a destination side of the macro instruction is cut out, and the register number is set in an operand field and the other source operand field of the modifying information 15. The controller 9 controls the modifying unit 3 in accordance with the control information 19. Specifically, the controller 9 orders the modifying unit 3 to execute an "OR" operation between the micro instruction 14 and the modifying instruction 15 with respect to the two source operand fields and the destination operand field. In addition, the controller 9 orders the modifying unit 3 to inhibit the modification of the micro instruction 14 by the modifying instruction 15 with respect to the operation field. Thus, the desired register numbers are set in the operand fields of the resultant modified micro instruction.

During a clock period t4 subsequent to the clock period t3, the arithmetic unit 12 executes a command in accordance with the modified micro instruction fed from the modifying unit 3.

The processing of the instruction "b" will be explained hereinafter. The processing of the instruction "b" is similar to the processing of the instruction "a" except for the following points.

In general, the instruction "b" is of various types. The instruction "b" explained here is of a type which makes it necessary to output two micro instructions to the arithmetic unit 12, one micro instruction being used For fetching a memory operand and the other micro instruction being used for operation between the fetched operand and a register. In some cases, the reason for needing two micro instructions is that operand fetch from a memory is necessary in respect of the instruction "b".

A macro instruction for the instruction "b" is fetched at the clock period t2.

During the clock period t3, the macro instruction is decoded by the decoder 7 so that an entry address 18 and control information 19 are generated by the decoder 7 on the basis of the macro instruction. The entry address 18 is fed to the address generator 6. The control information 19 is fed to the controllers 8 and 9.

During the clock period t4, the address generator 6 outputs an address denoted by the entry address 18, and the memory 1 outputs a micro instruction 14 in response to the address fed from the address generator 6. In this case, the operation field of the micro instruction 14 has information representing an operation for the fetch of a memory operand which is to be executed by the arithmetic unit 12, and the destination operand field has a register number of a temporary register. Since it is necessary to output a subsequent micro instruction during a next clock period, the memory 1 feeds the address generator 6 with control information 21 for generating an address of the subsequent micro instruction. In addition, the memory 1 feeds the controllers 8 and 9 with control information for generating modifying information related to the subsequent micro instruction. The selector 4 selects a macro instruction 16, and sets the macro instruction for the instruction "b" in the input register 5. The controller 9 controls the modifying unit 3 in accordance with the control information 19. Specifically, the controller 9 orders the modifying unit 3 to inhibit the modification of the micro instruction 14 by the modifying instruction 15 with respect to the two source operand fields, the destination operand field, and the operation field. Thus, the modifying unit 3 outputs a modified micro instruction identical with the input micro instruction 14. In parallel with the execution of these processes, address calculation of a memory operand is executed.

During a clock period t5 subsequent to the clock period t4, the arithmetic unit 12 executes memory fetch in accordance with the modified micro instruction fed from the modifying unit 3. The address for the subsequent micro instruction is outputted from the address generator 6 in response to the control information 21 which is outputted at the preceding clock period t4, and the memory 1 outputs a subsequent micro instruction 14 in response to the address fed from the address generator 6. In this case, while the operation field of the micro instruction 14 has information representing an operation to be executed by the arithmetic unit 12 and one of the source operand fields has a register number of a temporary register, the other source operand field and the destination operand field are set to "00 . . . 0". The input register 5 continues to store the macro instruction for the instruction "b". The controller 8 controls the modifying information generator 2 in accordance with the control information 22 which is outputted from the memory 1 at the preceding clock period t4, cutting out a register number field from the macro instruction for the instruction "b" and outputting the register number field from the modifying instruction generator 2 as modifying instruction 15. The register number field is necessary in a micro instruction. Specifically, a register number at a destination side of the macro instruction is cut out, and the register number is set in one of the source operand fields and the destination operand field of the modifying information 15. The controller 9 controls the modifying unit 3 in accordance with the control information 22 which is outputted from the memory 1 at the preceding clock period t4. Specifically, the controller 9 orders the modifying unit 3 to execute an "OR" operation between the micro instruction 14 and the modifying instruction 15 with respect to one of the two source operand fields and the destination operand field. In addition, the controller 9 orders the modifying unit 3 to inhibit the modification of the micro instruction 14 by the modifying instruction 15 with respect to the operation field and the other source operand field for which the memory 1 outputs the register number of the temporary register. Thus, the desired register number is set in the operand field of the resultant modified micro instruction.

During a clock period t6 subsequent to the clock period t5, the arithmetic unit 12 executes a command in accordance with the modified micro instruction fed from the modifying unit 3.

In the case of a macro instruction having a plurality of separate instruction codes, the instruction codes are sequentially inputted into the input register 5 while the processing of the macro instruction is advanced. The stack unit 11 saves the instruction codes stored in the input register 5. When a previous instruction code is required, it is fed from the stack unit 11 and is thus recovered. In the case where the saving and recovering process by the stack unit 11 is performed together with a subroutine of a micro instruction, a flexibility of a micro program is enhanced.

In the case where instructions for executing the saving and recovering processes on a plurality of registers have bit sequences denoting the registers, the target register number is updated as the processing is advanced. In such a case, one register number in a bit sequence set in the input register 5 is outputted by the modifying information generator 2 as modifying information 15, and the bit modifying unit 10 modifies the bit of the bit sequence which corresponds to the outputted register number. This process enables an increased speed of processing of a micro program and a simplification of the micro program.

The selector 4 is connected to a data bus 24 of the arithmetic unit 12. This design is intended to effectively process an instruction of a high function such as a bit field in which an operation is not designated in a macro instruction but it is designated in a general register within the arithmetic unit 12. The contents of the designated operation are transferred from the arithmetic unit 12 to the input register 5 via the selector 4. The contents of the designated operation are outputted from the input register 5 to the modifying information generator 2. The modifying information generator 2 sets the target operation in the operation field of modifying information 15. The modifying unit 3 executes an "OR" operation between a micro instruction and the modifying information 15 with respect to the operation field.

In the case where the sequence of processing an instruction depends on the results of an operation or data in a memory, the target data are transferred from the arithmetic unit 12 to the input register 5 via the selector 4, and the target data are outputted to the modifying information generator 2. The modifying information generator 2 generates branch information 25 on the basis of the target data. The branch information 25 represents judgment conditions for varying a processing sequence and an offset for a multi-direction branch. The branch information 25 is outputted to the address generator 6. This design enables an increased speed of processing of a micro program and an enhanced flexibility of the micro program. During such a branch process, data previously set in the input register 5 are sometimes required. Accordingly, when the target data are set in the input register 5, the previous data in the input register 5 are saved into the stack unit 11.

The modifying information generator 2 can be easily realized by using a PLA having a regular structure. The modifying unit 3 has a simple and regular structure. Accordingly, when the modifying unit 3 is composed of an LSI, it occupies only a very small area.

As understood from the previous description, one or more fields of a micro instruction outputted from the memory 1 can be disabled by the modifying unit 3. In addition, one or more fields of a micro instruction outputted from the memory 1 can be modified by the modifying unit 3 with modifying information outputted from the modifying information generator 2. As the processing of a micro instruction is advanced, the contents of the modification can be varied in accordance with information stored in the input register 5. Therefore, the flexibility of the modification of a micro instruction is enhanced, and a micro instruction is reduced by making micro instructions common and decreasing the number of steps.

The selector 4 is connected to the interruption reception unit 13 which stores information of interruption factors. This design is intended to effectively handle multi-reception of interruption factors, a variation in a process sequence which corresponds to interruption factors, and a variation in an address of an interruption vector to be read during the processing of receiving an interruption. A received interruption factor is transferred from the interruption reception unit 13 to the input register 5 via the selector 4. In the case of multi-reception of interruption factors, the modifying information generator 2 sets judgment conditions for varying a process sequence and an offset for a multi-direction branch with respect to the address generator 6. This design enables a simplified hardware for an interruption process and an enhanced flexibility of an interruption process sequence.

The selector 4 enables instruction codes and other information of various types to be used for modifying a micro instruction. The modification of micro instructions allows high-speed processing.

This embodiment may be modified as follows. While the modifying unit 3 is controlled by the controller 9 in accordance with the control information 22 outputted from the memory 1 in the embodiment, the control information 22 may be outputted from the modifying information generator 2 or other devices. The modifying information generator 2 may be also used as an arithmetic unit. In addition, the controllers 8 and 9 may be provided with stack devices.

What is claimed is:

1. A control device which executes steps of operation clock-period by clock-period, comprising:

first means for decoding a macro instruction into first address information and first control information during a first clock period;

second means, connected to the first means to receive the first address information therefrom, for storing a plurality of micro instructions and for selecting and outputting a first one of the micro instructions in response to the first address information during a second clock period following the first clock period;

third means, connected to the first means to receive the first control information therefrom, for generating a first control signal in response to the first control information during the second clock period;

fourth means, receiving the macro instruction and being connected to the third means to receive the first control signal therefrom, for generating first modifying information from the macro instruction in response to the first control signal during the second clock period; and fifth means, connected to the second means and the fourth means to receive said first one of the micro instructions and the first modifying information therefrom, for modifying at least part of said first one of the micro instructions with the first modifying information during the second clock period;

said second means being operative for selecting and outputting a second one of the micro instructions in response to at least part of said first one of the micro instructions during a third clock period following the second clock period;

said third means being connected to the second means to receive at least part of said first one of the micro instructions therefrom and being operative for generating a second control signal in response to at least part of said first one of the micro instructions during the third clock period;

said fourth means receiving the second control signal from the third means and being operative for generating second modifying information in response to the second control signal during the third clock period;

said fifth means receiving said second one of the micro instructions from the second means and the second modifying information from the fourth means and being operative for modifying at least part of said second one of the micro instructions with the second modifying information during the third clock period.

2. A control device which executes steps of operation clock-period by clock-period, comprising:

a decoder for decoding a macro instruction into first address information and first control information;

a memory, connected to the decoder to receive the first address information therefrom, for storing a plurality of micro instructions and for selecting and outputting a first one of the micro instructions in response to the first address information during a second clock period following the first clock period;

a controller, connected to the decoder to receive the first control information therefrom, for generating a first control signal in response to the first control information during the second clock period;

a modifying information generator, receiving the macro instruction and being connected to the controller to receive the first control signal therefrom, for generating first modifying information from the macro instruction in response to the first control signal during the second clock period; and a modifying unit, connected to the memory and the modifying information generator to receive said first one of the micro instructions and the first modifying information therefrom, for modifying at least part of said first one of the micro instructions with the first modifying information during the second clock period;

said memory being operative for selecting and outputting a second one of the micro instructions in response to at least part of said first one of the micro instructions during a third clock period following the second clock period;

said controller being connected to the memory to receive at least part of said first one of the micro instructions therefrom and being operative for generating a second control signal in response to at least part of said first one of the micro instructions during the third clock period;

said modifying information generator receiving the second control signal from the controller and being operative for generating second modifying information in response to the second modifying information in response to the second control signal during the third clock period;

said modifying unit receiving said second one of the micro instructions and the second modifying information from the memory and the modifying information generator and being operative for modifying at least part of said second one of the micro instructions with the second modifying information during the third clock period.

3. The control device of claim 2 wherein the modifying information generator comprises a programmable logic array.

4. The control device of claim 2 further comprising an address generator feeding an address to the memory, the memory outputting one of the micro instructions to the modifying unit in accordance with the address, the modifying information generator outputting branch information to the address generator, the address generator determining the address on the basis of the branch information.

5. The control device of claim 2 further comprising an input register, connected to the modifying information generator, for storing the macro instruction and outputting the macro instruction to the modifying information generator.

6. The control device of claim 2 further comprising an input register storing input data inputted into the modifying information generator, the modifying information generator generating the first modifying information on the basis of the input data stored in the input register.

7. The control device of claim 6 further comprising a bit modifying unit connected to the input register and modifying a portion of the input data which is contained in a predetermined bit of the input register.

8. The control device of claim 6 further comprising a stack unit connected to the input register, the stack unit storing output data from the input register and returning the output data back to the input register.

* * * * *